US005845007A

United States Patent [19]

Ohashi et al.

[11] Patent Number: 5,845,007

[45] Date of Patent: Dec. 1, 1998

[54] MACHINE VISION METHOD AND APPARATUS FOR EDGE-BASED IMAGE HISTOGRAM ANALYSIS

[75] Inventors: Yoshikazu Ohashi, Framingham; Russ Weinzimmer, Natick, both of Mass.

[73] Assignee: Cognex Corporation, Natick, Mass.

[21] Appl. No.: 581,975

[22] Filed: Jan. 2, 1996

[51] Int. Cl.$^6$ ................................ G06K 9/48; G06K 9/40

[52] U.S. Cl. ............................ 382/199; 382/168; 382/266

[58] Field of Search ..................................... 382/199, 168, 382/266, 271, 273

[56] References Cited

U.S. PATENT DOCUMENTS

| | | | |
|---|---|---|---|
| 3,936,800 | 2/1976 | Ejiri et al. . | |
| 4,115,702 | 9/1978 | Nopper . | |
| 4,115,762 | 9/1978 | Akiyama et al. . | |
| 4,183,013 | 1/1980 | Agrawala et al. | 340/146.3 |
| 4,200,861 | 4/1980 | Hubach et al. . | |
| 4,441,206 | 4/1984 | Kuniyoshi et al. . | |
| 4,570,180 | 2/1986 | Baier et al. | 382/199 |
| 4,685,143 | 8/1987 | Choate | 382/203 |
| 4,688,088 | 8/1987 | Hamazaki. | |
| 4,736,437 | 4/1988 | Sacks et al. . | |
| 4,783,826 | 11/1988 | Koso . | |
| 4,860,374 | 8/1989 | Murakami et al. . | |
| 4,876,457 | 10/1989 | Bose | 250/559.05 |
| 4,876,728 | 10/1989 | Roth . | |
| 4,922,543 | 5/1990 | Ahlbom et al. . | |
| 4,955,062 | 9/1990 | Terui . | |
| 4,959,898 | 10/1990 | Landman et al. . | |
| 4,962,243 | 10/1990 | Yamada et al. . | |
| 5,073,958 | 12/1991 | Imme . | |
| 5,081,656 | 1/1992 | Baker et al. . | |
| 5,081,689 | 1/1992 | Meyer et al. | 382/199 |
| 5,086,478 | 2/1992 | Kelly-Mahaffey et al. . | |
| 5,113,565 | 5/1992 | Cipolla et al. . | |
| 5,133,022 | 7/1992 | Weideman . | |
| 5,134,575 | 7/1992 | Takagi . | |
| 5,153,925 | 10/1992 | Tanioka et al. | 382/272 |
| 5,206,820 | 4/1993 | Ammann et al. . | |
| 5,225,940 | 7/1993 | Ishii et al. | 250/201.2 |
| 5,265,173 | 11/1993 | Griffin et al. . | |
| 5,273,040 | 12/1993 | Apicella et al. | 382/199 |
| 5,371,690 | 12/1994 | Engel et al. . | |
| 5,398,292 | 3/1995 | Aoyama | 382/199 |
| 5,525,883 | 6/1996 | Avitzour | 318/587 |

*Primary Examiner*—Andrew Johns
*Assistant Examiner*—Monica S. Davis
*Attorney, Agent, or Firm*—David J. Powsner

[57] ABSTRACT

A system for edge-based image histogram analysis permits identification of predominant characteristics of edges in an image. The system includes an edge detector that generates an edge magnitude image having a plurality of edge magnitude values based on pixels in the input image. The edge detector can be a Sobel operator that generates the magnitude values by taking the derivative of the input image values, i.e., the rate of change of intensity over a plurality of image pixels. A mask generator creates a mask based upon the values output by the edge detector. The mask can be used for masking input image values that are not in a region for which there is a sufficiently high edge magnitude. A mask applicator applies the pixel mask array to a selected image, e.g., the input image or an image generated therefrom (such as an edge direction image of the type resulting from application of a Sobel operator to the input image). A histogram generator generates a histogram of the pixel values in the masked image, i.e., a count of the number of image pixels that pass through the mask. A peak detector identifies the intensity value in the histogram that represents the predominant image intensity value (image segmentation threshold) or predominant edge direction values associated with the edge detected by the edge detector.

17 Claims, 8 Drawing Sheets

Input Image

Edge Magnitude Image

Sharpened Edge Magnitude Image

Binarized Sharpened Edge Magnitude Image (Mask)

Masked Input Image

Histogram of Masked Image

Input Image

Edge Magnitude Image

Sharpened Edge Magnitude Image

Binarized Sharpened Edge Magnitude Image (Mask)

Masked Input Image

Histogram of Masked Image

Input Image

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 10 | 10 | 10 | 10 | 0 | 0 | 0 |
| 0 | 0 | 0 | 10 | 10 | 10 | 10 | 0 | 0 | 0 |
| 0 | 0 | 0 | 10 | 10 | 10 | 10 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

Fig. 5

Image Intensity Derivative in X

| | | | | | | | |
|---|---|---|---|---|---|---|---|
| 0 | 0 | 0 | 0 | 0 | 0 | 0 | 0 |
| 0 | 10 | 10 | 0 | 0 | -10 | -10 | 0 |
| 0 | 30 | 30 | 0 | 0 | -30 | -30 | 0 |
| 0 | 40 | 40 | 0 | 0 | -40 | -40 | 0 |
| 0 | 30 | 30 | 0 | 0 | -30 | -30 | 0 |
| 0 | 10 | 10 | 0 | 0 | -10 | -10 | 0 |
| 0 | 0 | 0 | 0 | 0 | 0 | 0 | 0 |
| 0 | 0 | 0 | 0 | 0 | 0 | 0 | 0 |

Fig. 6

Image Intensity Derivative in Y

| | | | | | | | |
|---|---|---|---|---|---|---|---|
| 0 | 0 | 0 | 0 | 0 | -0 | 0 | 0 |
| 0 | 10 | 30 | 40 | 40 | 30 | 10 | 0 |
| 0 | 10 | 30 | 40 | 40 | 30 | 10 | 0 |
| 0 | 0 | 0 | 0 | 0 | 0 | 0 | 0 |
| 0 | -10 | -30 | -40 | -40 | -30 | -10 | 0 |
| 0 | -10 | -30 | -40 | -40 | -30 | -10 | 0 |
| 0 | 0 | 0 | 0 | 0 | 0 | 0 | 0 |
| 0 | 0 | 0 | 0 | 0 | 0 | 0 | 0 |

Fig. 7

Edge Magnitude Image

| | | | | | | | |
|---|---|---|---|---|---|---|---|
| 0 | 0 | 0 | 0 | 0 | 0 | 0 | 0 |
| 0 | 14 | 32 | 40 | 40 | 32 | 14 | 0 |
| 0 | 32 | 42 | 40 | 40 | 42 | 32 | 0 |
| 0 | 40 | 40 | 0 | 0 | 40 | 40 | 0 |
| 0 | 32 | 42 | 40 | 40 | 42 | 32 | 0 |
| 0 | 14 | 32 | 40 | [illegible] | 32 | 14 | 0 |
| 0 | 0 | 0 | 0 | 0 | 0 | 0 | 0 |
| 0 | 0 | 0 | 0 | 0 | 0 | 0 | 0 |

Fig. 8

Sharpened Edge Magnitude Image

| | | | | | | | |
|---|---|---|---|---|---|---|---|
| 0 | 0 | 0 | 0 | 0 | 0 | 0 | 0 |
| 0 | 0 | 0 | 40 | 40 | 0 | 0 | 0 |
| 0 | 0 | 42 | 0 | 0 | 42 | 0 | 0 |
| 0 | 40 | 0 | 0 | 0 | 0 | 40 | 0 |
| 0 | 0 | 42 | 0 | 0 | 42 | 0 | 0 |
| 0 | 0 | 0 | [illegible] | 40 | 0 | 0 | 0 |
| 0 | 0 | 0 | 0 | 0 | 0 | 0 | 0 |
| 0 | 0 | 0 | 0 | 0 | 0 | 0 | 0 |

Fig. 9

Theshold: 39

Binarized Sharpened Edge Magnitude Image (Mask)

| | | | | | | | |
|---|---|---|---|---|---|---|---|
| 0 | 0 | 0 | 0 | 0 | 0 | 0 | 0 |
| 0 | 0 | 0 | 1 | 1 | 0 | 0 | 0 |
| 0 | 0 | 1 | 0 | 0 | 1 | 0 | 0 |
| 0 | 1 | 0 | 0 | 0 | 0 | 1 | 0 |
| 0 | 0 | 1 | 0 | 0 | 1 | 0 | 0 |
| 0 | 0 | 0 | 1 | 1 | 0 | 0 | 0 |
| 0 | 0 | 0 | 0 | 0 | 0 | 0 | 0 |
| 0 | 0 | 0 | 0 | 0 | 0 | 0 | 0 |

Fig. 10

Masked Image

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 10 | 0 | 0 | 10 | 0 | 0 |
| 0 | 0 | 0 | 0 | 0 | 0 | 0 | 0 |
| 0 | 0 | 10 | 0 | 0 | 10 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig. 11

MACHINE VISION METHOD AND APPARATUS FOR EDGE-BASED IMAGE HISTOGRAM ANALYSIS

RESERVATION OF COPYRIGHT

The disclosure of this patent document contains material which is subject to copyright protection. The owner thereof has no objection to facsimile reproduction by anyone of the patent document or the patent disclosure, as it appears in the U.S. Patent and Trademark Office patent file or records, but otherwise reserves all rights under copyright law.

BACKGROUND OF THE INVENTION

The invention pertains to machine vision and, more particularly, to a method and apparatus for histogram-based analysis of images.

In automated manufacturing, it is often important to determine the location, shape, size and/or angular orientation of an object being processed or assembled. For example, in automated circuit assembly, the precise location of a printed circuit board must be determined before conductive leads can be soldered to it.

Many automated manufacturing systems, by way of example, rely on the machine vision technique of image segmentation as a step toward finding the location and orientation of an object. Image segmentation is a technique for determining the boundary of the object with respect to other features (e.g., the object's background) in an image.

One traditional method for image segmentation involves determining a pixel intensity threshold by constructing a histogram of the intensity values of each pixel in the image. The histogram, which tallies the number of pixels at each possible intensity value, has peaks at various predominant intensities in the image, e.g., the predominant intensities of the object and the background. From this, an intermediate intensity of the border or edge separating the object from the background can be inferred.

For example, the histogram of a back-lit object has a peak at the dark end of the intensity spectrum which represents the object or, more particularly, portions of the image where the object prevents the back-lighting from reaching the camera. It also has a peak at the light end of the intensity spectrum which represents background or, more particularly, portions of the image where the object does not prevent the back-lighting from reaching the camera. The image intensity at the edges bounding the object is typically inferred to lie approximately half-way between the light and dark peaks in the histogram.

A problem with this traditional image segmentation technique is that its effectiveness is principally limited to use in analysis of images of back-lit objects, or other "bimodal" images (i.e., images with only two intensity values, such as dark and light). When objects are illuminated from the front—as is necessary in order to identify edges of surface features, such as circuit board solder pads—the resulting images are not bimodal but, rather, show a potentially complex pattern of several image intensities. Performing image segmentation by inferring image intensities along the edge of an object of interest from the multitude of resulting histogram peaks is problematic.

According to the prior art, image characteristics along object edges, e.g., image segmentation threshold, of the type produced by the above-described image segmentation technique, are used by other machine vision tools to determine an object's location or orientation. Two such tools are the contour angle finder and the "blob" analyzer. Using an image segmentation threshold, the contour angle finder tracks the edge of an object to determine its angular orientation. The blob analyzer also uses an image segmentation threshold to determine both the location and orientation of the object. Both tools are discussed, by way of example, in U.S. Pat. No. 5,371,060, which is assigned to the assignee hereof, Cognex Corporation.

Although contour angle finding tools and blob analysis tools of the type produced by the assignee hereof have proven quite effective at determining the angular orientation of objects, it remains a goal to provide additional tools to facilitate such determinations.

An object of this invention is to provide improved a method and apparatus for machine vision analysis and, particularly, improved methods for determining characteristics of edges and edge regions in an image.

A further object of the invention is to provide improved a method and apparatus for determining such characteristics as predominant intensity and predominant edge direction.

Still another object is to provide such a method and apparatus that can determine edge characteristics from a wide variety of images, regardless of whether the images represent front-lit or back-lit objects.

Yet another object of the invention is to provide such a method and apparatus as can be readily adapted for use in a range of automated vision applications, such as automated inspection and assembly, as well as in other machine vision applications involving object location.

Yet still another object of the invention is to provide such a method and apparatus that can execute quickly, and without consumption of excessive resources, on a wide range of machine vision analysis equipment.

Still yet another object of the invention is to provide an article of manufacture comprising a computer readable medium embodying a program code for carrying out such an improved method.

SUMMARY OF THE INVENTION

The foregoing objects are attained by the invention which provides apparatus and methods for edge-based image histogram analysis.

In one aspect, the invention provides an apparatus for identifying a predominant edge characteristic of an input image that is made up of a plurality of image values (i.e., "pixels") that contain numerical values representing intensity (e.g., color or brightness). The apparatus includes an edge detector that generates a plurality of edge magnitude values based on the input image values. The edge detector can be a Sobel operator that generates the magnitude values by taking the derivative of the input image values, i.e., the rate of change of intensity over a plurality of image pixels.

A mask generator creates a mask based upon the values output by the edge detector. For example, the mask generator can create an array of masking values (e.g. 0s) and non-masking values (e.g.,1s), each of which depends upon the value of the corresponding edge magnitude values. For example, if an edge magnitude value exceeds a threshold, the corresponding mask value will contain a 1, otherwise it contains a 0.

In an aspect of the invention for determining a predominant edge intensity, or image segmentation threshold, the mask is utilized for masking input image values that are not in a region for which there is a sufficiently high edge magnitude. In an aspect of the invention for determining a predominant edge direction, the mask is utilized for masking edge direction values that are not in such a region.

A mask applicator applies the pixel mask array to a selected image to generate a masked image. That selected image can be an input image or an image generated therefrom (e.g., an edge direction image of the type resulting from application of a Sobel operator to the input image).

A histogram generator generates a histogram of the pixel values in the masked image, e.g., a count of the number of image pixels that pass through the mask at each intensity value or edge direction and that correspond with non-masking values of the pixel mask. A peak detector identifies peaks in the histogram representing, in an image segmentation thresholding aspect of the invention, the predominant image intensity value associated with the edge detected by the edge detector—and, in an object orientation determination aspect of the invention, the predominant edge direction (s) associated with the edge detected by the edge detector.

Still further aspects of the invention provide methods for identifying an image segmentation threshold and for object orientation determination paralleling the operations of the apparatus described above.

Still other aspects of the invention is an article of manufacture comprising a computer usable medium embodying program code for causing a digital data processor to carry out the above methods of edge-based image histogram analysis.

The invention has wide application in industry and research applications. Those aspects of the invention for determining a predominant edge intensity threshold provide, among other things, an image segmentation threshold for use in other machine vision operations, e.g., contour angle finding and blob analysis, for determining the location and orientation of an object. Those aspects of the invention for determining a predominant edge direction also have wide application in the industry, e.g., for facilitating determination of object orientation, without requiring the use of additional machine vision operations.

These and other aspects of the invention are evident in the drawings and in the description that follows.

BRIEF DESCRIPTION OF THE DRAWINGS

A more complete understanding of the invention may be attained by reference to the drawings, in which:

FIG. 5 shows pixel values of a sample input image to be processed by a method and apparatus according to the invention;

FIGS. 6–8 show pixel values of intermediate images and of an edge magnitude image generated by application of a Sobel operator during a method and apparatus according to the invention;

FIG. 9 shows pixel values of a sharpened edge magnitude image generated by a method and apparatus according to the invention;

FIG. 10 shows a pixel mask array generated by a method and apparatus according to the invention;

FIG. 11 shows pixel values of a masked input image generated by a method and apparatus according to the invention.

DETAILED DESCRIPTION OF THE ILLUSTRATED EMBODIMENT

Figure 1:
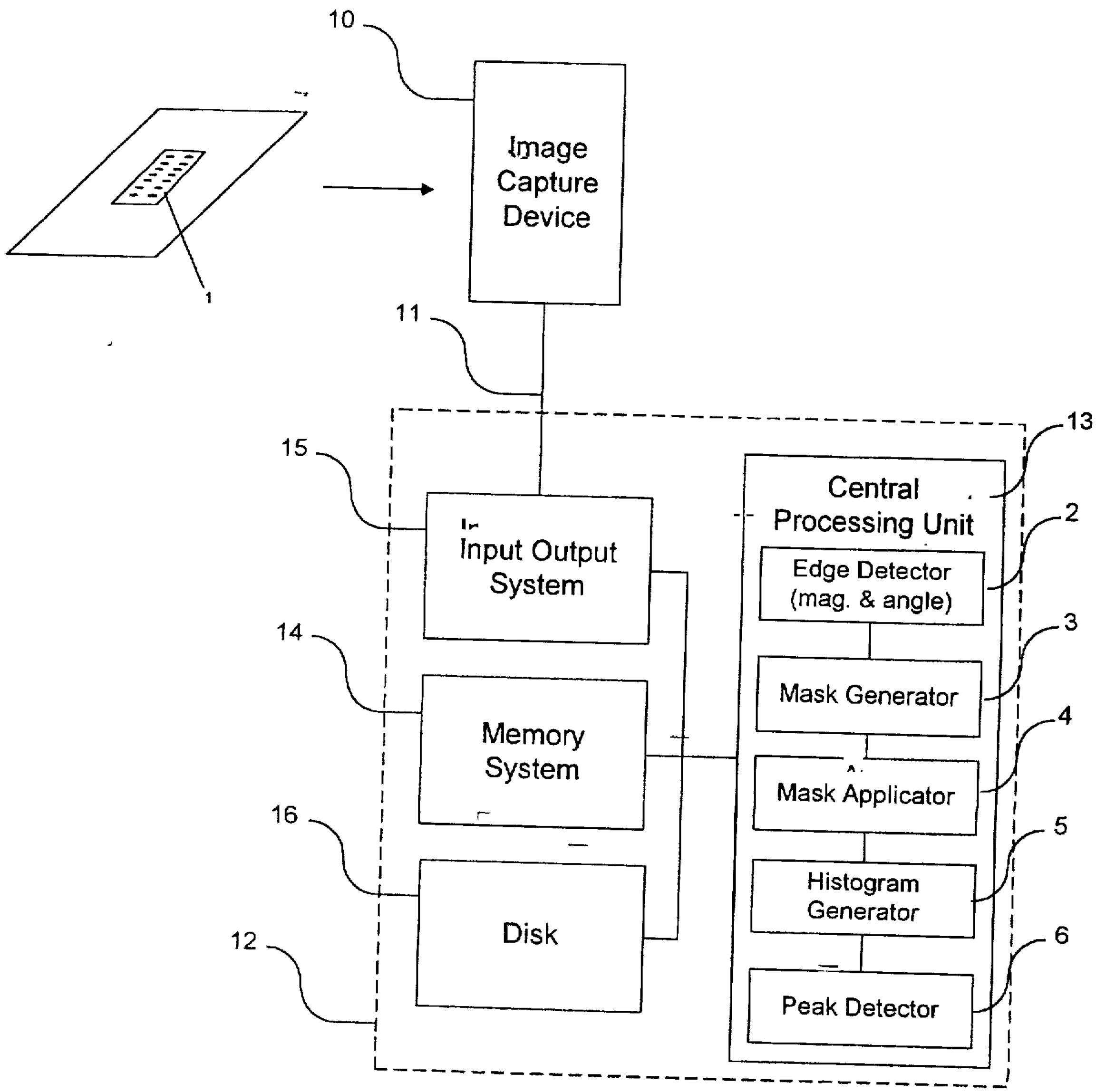
FIG. 1 depicts a digital data processor including apparatus for edge-based image histogram analysis according to the invention.

FIG. 1 illustrates a system for edge-based image histogram analysis. As illustrated, a capturing device 10, such as a conventional video camera or scanner, generates an image of a scene including object 1. Digital image data (or pixels) generated by the capturing device 10 represent, in the conventional manner, the image intensity (e.g., color or brightness) of each point in the scene at the resolution of the capturing device.

That digital image data is transmitted from capturing device 10 via a communications path 11 to an image analysis system 12. This can be a conventional digital data processor, or a vision processing system of the type commercially available from the assignee hereof, Cognex Corporation, as programmed in accord with the teachings hereof to perform edge-based image histogram analysis. The image analysis system 12 may have one or more central processing units 13, main memory 14, input-output system 15, and disk drive (or other static mass storage device) 16, all of the conventional type.

The system 12 and, more particularly, central processing unit 13, is configured by programming instructions according to teachings hereof for operation as an edge detector 2, mask generator 3, mask applicator 4, histogram generator 5 and peak detector 6, as described in further detail below. Those skilled in the art will appreciate that, in addition to implementation on a programmable digital data processor, the methods and apparatus taught herein can be implemented in special purpose hardware.

Figure 2A:
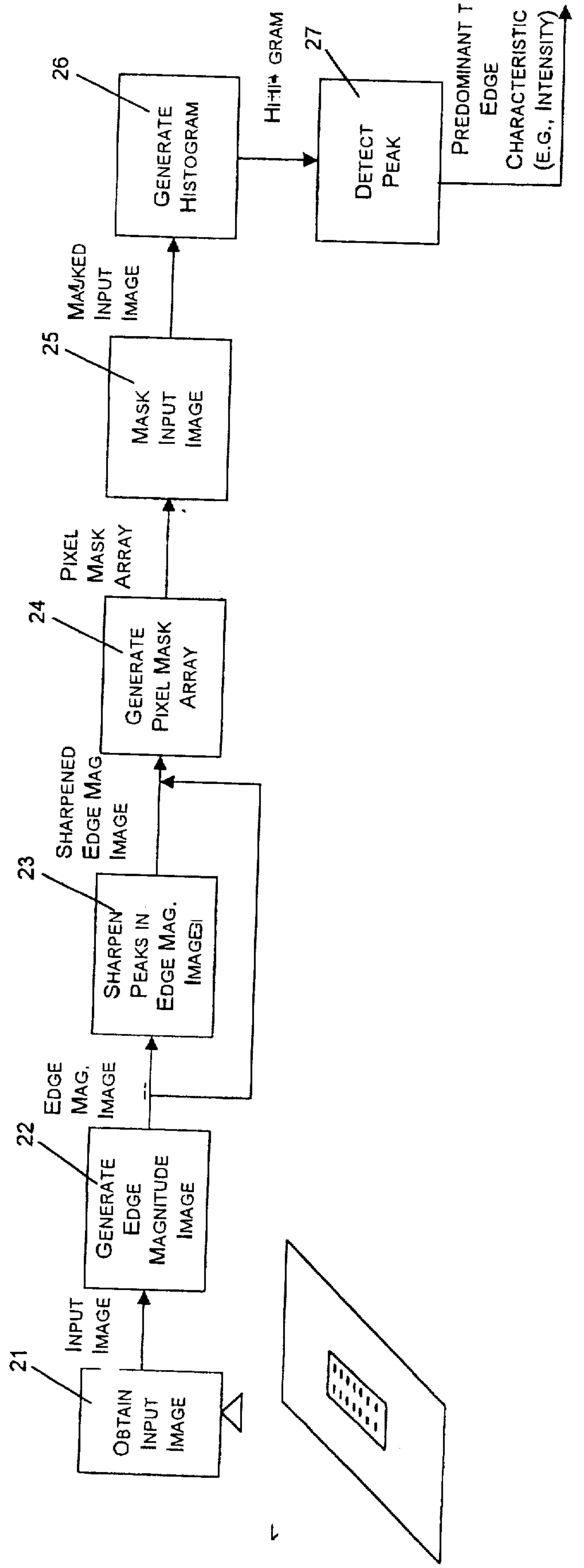
FIG. 2A illustrates the steps in a method for edge-based image histogram analysis according to the invention for use in identifying an image segmentation threshold.

FIG. 2A illustrates the steps in a method for edge-based image histogram analysis according to the invention for use in identifying an image segmentation threshold, that is, for use in determining a predominant intensity of an edge in an image. To better describe the processing performed in each of those steps, reference is made throughout the following discussion to graphical and numerical examples shown in FIGS. 3–12. In this regard, FIGS. 3A–3F and 4A–4F graphically illustrate the sequence of images generated by the method of FIG. 2A. The depiction in FIGS. 4A–4F is in two dimensions; that of FIGS. 3A–3F is in "one dimension," e.g., in the form of a scan line. FIGS. 5–12 illustrate in numerical format the values of pixels of a similar sequence of images, as well as intermediate arrays generated by the method of FIG. 2A.

Notwithstanding the simplicity of the examples, those skilled in the art will appreciate that the teachings herein can be applied to determine the predominant edge characteristics of in a wide variety of images, including those far more complicated than these examples. In addition, with particular reference to the images and intermediate arrays depicted in FIGS. 5–11, it will be appreciated that the teachings herein can be applied in processing images of all sizes.

Referring to FIG. 2A, in step 21, a scene including an object of interest is captured by image capture device 10 (o...

FIG. 1). As noted above, a digital image representing the scene is generated by the capturing device 10 in the conventional manner, with pixels representing the image intensity (e.g., color or brightness) of each point in the scene per the resolution of the capturing device 10. The captured image is referred to herein as the "input" or "original" image.

For sake of simplicity, in the examples shown in the drawings and described below, the input image is assumed to show a dark rectangle against a white background. This is depicted graphically in FIGS. 3A and 4A. Likewise, it is depicted numerically in the FIG. 5, where the dark rectangle is represented by a grid of image intensity 10 against a background of image intensity 0.

Figure 3A:
FIGS. 3A–3F graphically illustrate, in one dimension (e.g., a "scan line"), the sequence of images generated by a method and apparatus according to the invention.
Figure 3B:
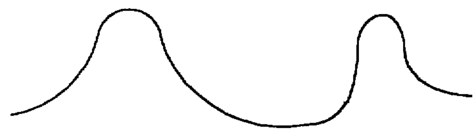

In step 22, the illustrated method operates as an edge detector, generating an edge magnitude image with pixels that correspond to input image pixels, but which reflect the rate of change (or derivative) of image intensities represented by the input image pixels. Referring to the examples shown in the drawings, such edge magnitude images are shown in FIG. 3B (graphic, one dimension), FIG. 4B (graphic, two dimensions) and FIG. 8 (numerical, by pixel).

In a preferred embodiment, edge detector step 22 utilizes a Sobel operator to determine the magnitudes of those rates of change and, more particularly, to determine the rates of change along each of the x-axis and y-axis directions of the input image. Use of the Sobel operator to determine rates of change of image intensities is well known in the art. See, for example, Sobel, *Camera Models and Machine Perception*, Ph. D. Thesis, Electrical Engineering Dept., Stanford Univ. (1970), and Prewitt, J. "Object Enhancement and Extraction" in *Picture Processing and Psychopictorics*, B. Lipkin and A. Rosenfeld (eds.), Academic Press (1970), the teachings of which are incorporated herein by reference. Still more preferred techniques for application of the Sobel operator are described below and are executed in a machine vision tool commercially available from the assignee hereof under the tradename $CIP_{13}SOBEL$.

The rate of change of the pixels of the input image along the x-axis is preferably determined by convolving that image with the matrix:

$$\begin{matrix} -1 & 0 & 1 \\ -2 & 0 & 2 \\ -1 & 0 & 1 \end{matrix}$$

FIG. 6 illustrates the intermediate image resulting from convolution of the input image of FIG. 5 with the foregoing matrix.

The rate of change of the pixels of the input image along the y-axis is preferably determined by convolving that image with the matrix:

$$\begin{matrix} -1 & -2 & -1 \\ 0 & 0 & 0 \\ 1 & 2 & 1 \end{matrix}$$

FIG. 7 illustrates the intermediate image resulting from convolution of the input image of FIG. 5 with the foregoing matrix.

The pixels of the edge magnitude image, e.g., of FIG. 8, are determined as the square-root of the sum of the squares of the corresponding pixels of the intermediate images, e.g., of FIGS. 6 and 7. Thus, for example, the magnitude represented by the pixel in row 1/column 1 of the edge magnitude image of FIG. 8 is the square root of the sum of (1) the square of the value in row 1/column 1 of the intermediate image of FIG. 6, and (2) the square of the value in row 1/column 1 of the intermediate image of FIG. 7.

Figure 3C:
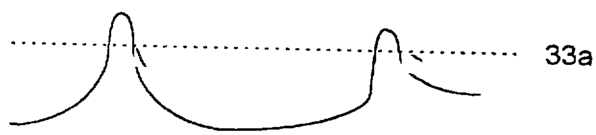
Figure 3D:

Referring back to FIG. 2A, in step 23 the illustrated method operates as peak sharpener, generating a sharpened edge magnitude image that duplicates the edge magnitude image, but with sharper peaks. Particularly, the peak sharpening step 23 strips all but the largest edge magnitude values from any peaks in the edge magnitude image. Referring to the examples shown in the drawings, such sharpened edge magnitude images are shown in FIG. 3C (graphic, one dimension), FIG. 4C (graphic, two dimensions) and FIG. 9 (numerical, by pixel).

In the illustrated embodiment, the sharpened edge magnitude image is generated by applying the cross-shaped neighborhood operator shown below to the edge magnitude image. Only those edge magnitude values in the center of each neighborhood that are the largest values for the entire neighborhood are assigned to the sharpened edge magnitude image, thereby, narrowing any edge magnitude value peaks.

$$\begin{matrix} & 1 & \\ 1 & 1 & 1 \\ & 1 & \end{matrix}$$

A further understanding of sharpening may be attained by reference to FIG. 9, which depicts a sharpened edge magnitude image generated from the edge magnitude image of FIG. 8.

In step 24 of FIG. 2A, the illustrated method operates as a mask generator for generating a pixel mask array from the sharpened edge magnitude image. In a preferred embodiment, the mask generator step 24 generates the array with masking values (e.g. 0s) and non-masking values (e.g., 1s), each of which depends upon the value of a corresponding pixel in the sharpened edge magnitude image. Thus, if a magnitude value in a pixel of the sharpened edge magnitude image exceeds a threshold value (labelled as element 33*a* in FIG. 3C), the corresponding element of the mask array is loaded with a non-masking value of 1, otherwise it is loaded with a masking value of 0.

Those skilled in the art will appreciate that the mask generator step 24 is tantamount to binarization of the sharpened edge magnitude image. The examples shown in the drawings are labelled accordingly. See, the mask or binarized sharpened edge magnitude image shown in FIGS. 3D, 4D and 10. In the example numerical shown in FIG. 10, the threshold value is 42.

Those skilled in the art will further appreciate that the peak sharpening step 23 is optional and that the mask can be generated by directly "binarizing" the edge magnitude image.

Figure 3E:

In step 25 of FIG. 2A, the illustrated method operates as a mask applicator, generating a masked image by applying the pixel mask array to the input image to include in the masked image only those pixels from the input image that correspond to non-masking values in the pixel array. It will be appreciated that in the image segmentation embodiment of FIG. 2A, the pixel mask array has the effect of passing through to the masked image only those pixels of the input image that are in a region for which there is a sufficiently high edge magnitude. Referring to the examples shown in the drawings, a masked input image is shown in FIG. 3E (graphic, one dimension), FIG. 4E (graphic, two dimensions) and FIG. 11 (numerical, by pixel). FIG. 11, particularly, reveals that the masked image contains a portion of the dark square (the value 10) and a portion of the background (the value 0) of the input image.

Figure 3F:
Figure 4A:
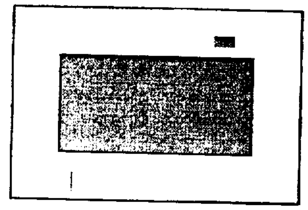
FIGS. 4A–4F graphically illustrate, in two dimensions, the sequence of images generated by a method and apparatus according to the invention.
Figure 4B:
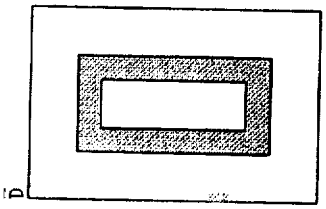
Figure 4C:
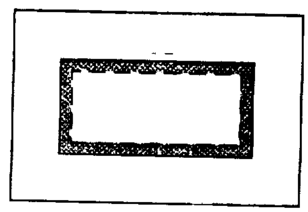
Figure 4D:
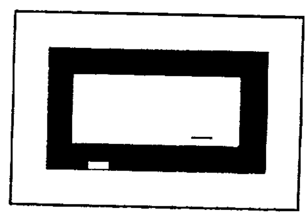
Figure 4E:
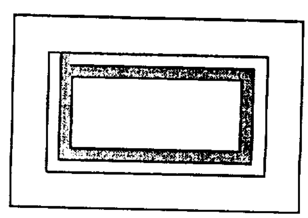
Figure 4F:
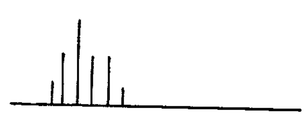
Figure 12:
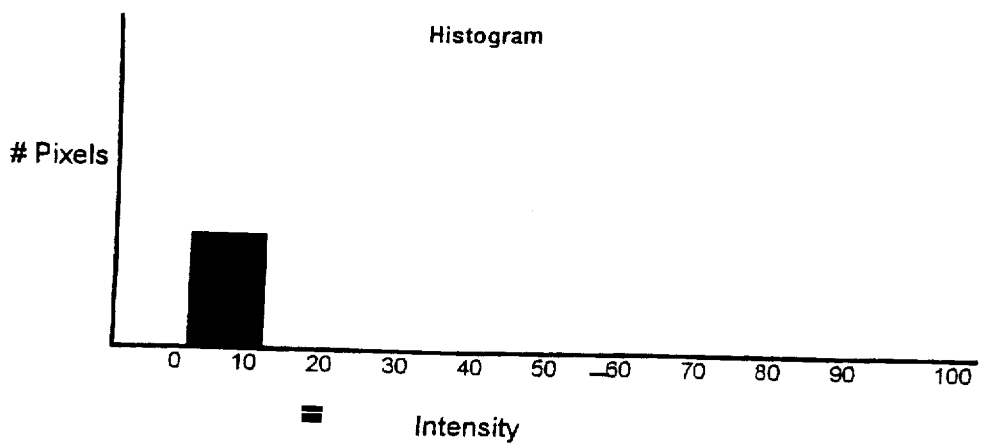
FIG. 12 illustrates a histogram created from the masked image values of FIG. 11.

In step 26 of FIG. 2A, the illustrated method operates as a histogram generator, generating a histogram of values in the masked image, i.e., a tally of the number of non-zero pixels at each possible intensity value that passed from the input image through the pixel mask array. Referring to the examples shown in the drawings, such a histogram is shown in FIGS. 3F, 4F and 12.

In step 27 of FIG. 2A, the illustrated method operates as a peak detector, generating an output signal representing peaks in the histogram. As those skilled in the art will appreciate, those peaks represent various predominant edge intensities in the masked input image. This information may be utilized in connection with other machine vision tools, e.g., contour angle finders and blob analyzers, to determine the location and/or orientation of an object.

A software listing for a preferred embodiment for identifying an image segmentation threshold according to the invention is filed herewith as an Appendix. The program is implemented in the C programming language on the UNIX operating system.

Figure 2B:
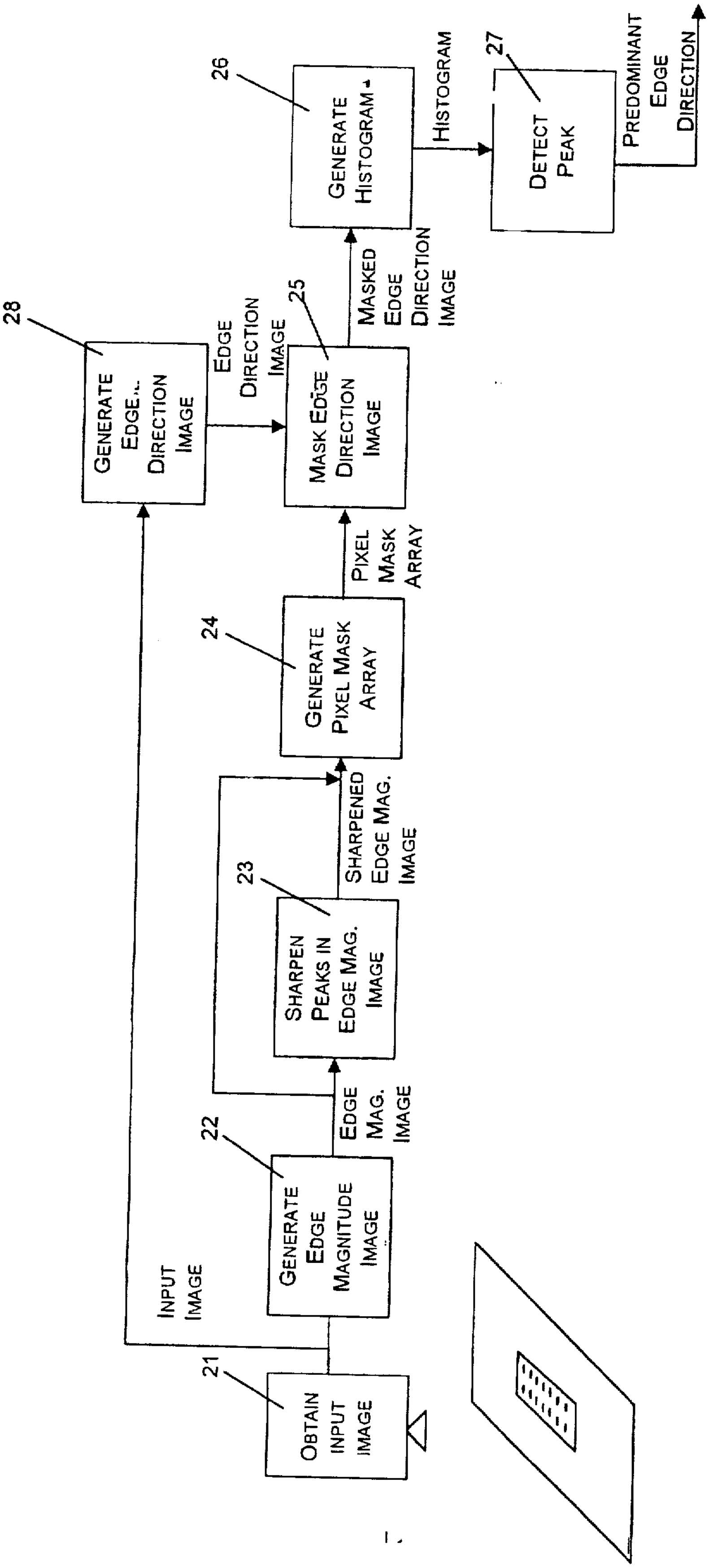
FIG. 2B illustrates the steps in a method for edge-based image histogram analysis according to the invention for use in determining a predominant edge direction in an image.

Methods and apparatus for edge-based image histogram analysis according to the invention can be used to determine a variety of predominant edge characteristics, including predominant image intensity (or image segmentation threshold) as described above. In this regard, FIG. 2B illustrates the steps in a method for edge-based image histogram analysis according to the invention for use in determining object orientation by determining one or more predominant directions of an edge in an image. Where indicated by like reference numbers, the steps of the method shown in FIG. 2B are identical to those of FIG. 2A.

As indicated by new reference number 28, the method of FIG. 2B includes the additional step of generating an edge direction image with pixels that correspond to input image pixels, but which reflect the direction of the rate of change (or derivative) of image intensities represented by the input image pixels. In a preferred embodiment, step 28 utilizes a Sobel operator of the type described above to determine the direction of those rates of change. As before, use of the Sobel operator in this manner is well known in the art.

Furthermore, whereas mask applicator step 25 of FIG. 2A generates a masked image by applying the pixel mask array to the input image, the mask applicator step 25' of FIG. 2B generates the masked image by applying the pixel mask array to the edge direction image. As a consequence, the output of mask applicator step 25' is a masked edge direction image (as opposed to a masked input image). Consequently, the histogram generating step 26 and the peak finding step 27 of FIG. 2B have the effect of calling out one or more predominant edge directions (as opposed to the predominant image intensities) of the input image.

From this predominant edge direction information, the orientation of the object bounded by the edge can be inferred. For example, if the object is rectangular, the values of the predominant edge directions can be interpreted modulo 90-degrees to determine angular rotation. By way of further example, if the object is generally round, with one flattened or notched edge (e.g., in the manner of a semiconductor wafer), the values of the predominant edge directions can also be readily determined and, in turn, used to determine the orientation of the object. Those skilled in the art will appreciate that the orientation of still other regularly shaped objects can be inferred from the predominant edge direction information supplied by the method of FIG. 2B.

A further embodiment of the invention provides an article of manufacture, to wit, a magnetic diskette (not illustrated), composed of a computer readable media, to wit, a magnetic disk, embodying a computer program that causes image analysis system 12 (FIG. 1) to be configured as, and operate in accord with, the edge-based histogram analysis apparatus and method described herein. Such a diskette is of conventional construction and has the computer program stored on the magnetic media therein in a conventional manner readable, e.g., via a read/write head contained in a diskette drive of image analyzer 12. It will be appreciated that a diskette is discussed herein by way of example only and that other articles of manufacture comprising computer usable media on which programs intended to cause a computer to execute in accord with the teachings hereof are also embraced by the invention.

Described herein are apparatus and methods for edge-based image histogram analysis meeting the objects set forth above. It will be appreciated that the embodiments described herein are not intended to be limiting, and that other embodiments incorporating additions, deletions and other modifications within the ken of one of ordinary skill in the art are in the scope of the invention.

APPENDIX

Patent Application For

MACHINE VISION METHOD AND APPARATUS FOR
EDGE-BASED IMAGE HISTOGRAM ANALYSIS ceet_if.h@@/main/4

1

```
/*
 *
 *      Copyright (c) $Date: Mon Oct 24 15:11:15 1994$
 *      Cognex Corporation, Needham, MA 02194
 *
 *      $Source: ceet_if.h$
 *      $Revision: /main/4$
 *      $Locker: yoshi$
 *
 */

/**********************************************************************\
 *
 *              Cognex   ge Emphasized Threshold
 *
\**********************************************************************/

#ifndef c_ceet_if_h
#define c_ceet_if_h

#ifndef c_ansiprot_h
#include <ansiprot.h>
#endif

#ifndef c_cip_h
#include <cip.h>
#endif

#ifndef c_cip_peak_h
#include <edgedet/cip_peak.h>    /* cip_peak_params */
#endif

#ifndef c_cip_edge_h
#include <edgedet/cip_edge.h>    /* cip_edge_params, _data, _results */
#endif

#ifndef c_cd_res_h
#include <cd_res.h>              /* cd_resources */
#endif

#ifdef __cplusplus
extern "C" {
#endif

/**********************************************************************\
 *
 * Data Structures
 *
\**********************************************************************/

typedef struct
{
  double        sobel_top;       /* a cut-off factor for sobel */
                                 /* normally 0.4-0.5 */

  cd_resources  * diag_context;  /* diagnostics resources */
  long          diag_flags;      /* diagnostics flags */
} ceet_params;

/*
 * <sobel_top> is necessary to determine the Sobel threshold.
 * Sobel peaks stronger than the Sobel threshold will be used for
 * masking. The Sobel Threshold is such an intensity that
 * the sum of (Sobel peak intensities >= SobelThreshold) is equal to
 *          <sobel_top> * (Total non-zero intensities)
 * Note that the intensity zero is excluded from the consideration.
 */

typedef struct
{
  cip_edge_params     * edge_params_p;   /* input to cip_sobel_init()     */
  cip_peak_params     * peak_params_p;   /* a part of cip_edge_params     */
  cip_edge_data       * edge_data_p;     /* output from cip_sobel_init()  */
                                         /* input to cip_sobel(). Need not */
                                         /* be allocated by a user        */
  cip_edge_results    * edge_results_p;  /* output from cip_sobel()       */
  int                 internal;          /* internal use                  */
} ceet_data;

/*
 * ceet_data holds all necessary data structures for cip_sobel_init()
 * and cip_sobel().
 */

typedef struct
{
  int   hist_edge[256];     /* histogram array of the edge emphasized image */
  int   hist_sobel[256];    /* histogram array of the sobel image          */
  int   time[6];            /* timing in msec. See next for definition     */
} ceet_results;

/*
 *  time array indices
 */

#define CEET_TIME_SOBEL 0         /* time on sobel operation                  */
#define CEET_TIME_SOBEL_HIST 1    /* time for histograming the edge image     */
#define CEET_TIME_MASK 2          /* time for masking operation               */
#define CEET_TIME_IMAGE_HIST 3    /* time for histograming the masked image   */
#define CEET_TIME_THRESHOLD 4     /* time for threshold calculation           */
#define CEET_TIME_TOTAL 5         /* total time spent in ceet_edge_threshold */

/**********************************************************************\
 *
 * Debug flags
 *
\**********************************************************************/
#define CEET_PRINT_TIMER          0x00000001
#define CEET_PRINT_INTERNAL       0x00000002
#define CEET_PRINT_HISTOGRAM      0x00000004
#define CEET_SHOW_IMAGE           0x00000100

/**********************************************************************\
 *
 *  Function prototypes
 *
\**********************************************************************/


/* ------------------------------------------------------------------ */

int ceet_edge_threshold PROTO((cip_buffer * image,
                               ceet_params * thresh_params,
                               ceet_data * thresh_data,
                               ceet_results ** thresh_results_pp));

/* ------------------------------------------------------------------

  EFFECTS

```

App. P. 1 ceet_if.h@@/main/4

2

```
    This function performs the following steps.
    1. Prepares the first derivative image using the Sobel magnitude
       function.
    2. From the histogram of [1], determine a cut-off value for the
       mask image.
    3. Binarizes the Sobel image for a mask.
    4. Masks out the original image with the [3].
    5. Computes a histogram for [4].
    6. From [5], determines the threshold value.

    -1 is returned if threshold is indeterminate (e.g. the Sobel
    magnitude map is totally zero.)

    If <thresh_results> is not NULL, the results will be returned.  If it
    is NULL, no results will be returned.

  NOTES

    Not required, but coprocessors VC2 and VC1 (or VC3) will improve the
    execution speed. VC2 is used for Sobel operations and VC1 (or VC3) is
    used for histograming.

  REQUIRES

    <thresh_params> and <thresh_data> must point to valid structures.
    The minimum size of <thresh_params->image> is 5 x 5.

    <thresh_params->sobel_top> must be positive and less than or equal
    to 1.0, i.e.  0.0 < x <= 1.0 where x is the value.

  SIGNALS

    CORN_ERR_BADARG - if <thresh_params> is NULL.
                      if <thresh_data> is NULL.
                      if <image> is NULL.


  ----------------------------------------------------------------------- */

ceet_data * ceet_create PROTO ((ceet_data * thresh_data));

/* -----------------------------------------------------------------------


  EFFECTS

    Allocates and initializes all necessary data structures in preparation
    for ceet_edge_threshold().

    The simplest use is

         ceet_data* thresh_data;

         thresh_data = ceet_create(NULL);

    which will allocate the ceet_data structure (and all other necessary
    data structures) and return its pointer.

    If the ceet_data structure is allocated by a user, <internal> must be
    cleared.  In this case only data structures with the null pointer will
    be allocated by ceet_create()

         ceet_data thresh_data;
         thresh_data.internal = 0;      << must be cleared if allocated

         thresh_data.edge_data_p=0;
         thresh_data.edge_params_p=0;
              :
         ceet_create(&thresh_data);

    If necessary, some of the parameters in the ceet_data created by
    ceet_create() can be modified. (See cip_edge.h and cip_peak.h for
    more details.) Changes, however, will not be effective until
    ceet_create() is called again. <edge_data_p> need not be allocated
    because it is allocated by cip_sobel_init() which is called in
    ceet_create().

    See ceet_default.h for default setting.

  NOTES

    Data structures <cip_edge_params> and <cip_peak_params> are set up
    appropriately for the Sobel magnitude operation and the <cip_edge_data>
    structure is initialized and returned by cip_sobel_init().

    If cus_save_system() is done on a system with VC2 and then it is
    executed on another system with no VC2, an error CEDGE_ERR_COPROCESSOR
    is thrown from cip_sobel_init(). For this situation (non-VC2 system is
    built on the VC2 present system), set the CIP_EDGE_FLAG_INHIBIT_VC2 bit
    in <edge_params_p->flags>.


  REQUIRES

    If <thresh_data> is allocated by a user
                  thresh_data->internal=0;
    only for the first call.


  SIGNALS

    None from ceet_create() itself. However, if functions called from
    ceet_create(), e.g. cip_sobel_init(), throws an error, none of
    requested data structures including <ceet_data> is allocated.

  ----------------------------------------------------------------------- */

void ceet_delete PROTO ((ceet_data * thresh_data));

/* -----------------------------------------------------------------------


  EFFECTS

    Deallocates the data structures allocated by ceet_create().
    User-allocated data structures will not be deleted.

  SIGNALS

    None.
  ----------------------------------------------------------------------- */

#ifdef __cplusplus
}
#endif

#endif /* !C_ceet_h */
```

App P. 2 ceet_default.h@@/main/1

1

```
/*
 *
 *      Copyright (c) $Date: Mon Oct 24 15:06:21 1994$
 *      Cognex Corporation, Needham, MA 02194
 *
 *      $Source: ceet_default.h$
 *      $Revision: /main/1$
 *      $Locker: yoshi$
 *
 */

#ifndef c_ceet_defs_h
#define c_ceet_defs_h

#ifndef c_ansiprot_h
#include <ansiprot.h>
#endif

#ifdef __cplusplus
extern "C" {
#endif

/*************************************************************************\
 *
 * This file describes default setting that ceet_create() will
 * assign to each parameter.
 *
\*************************************************************************/

/*} /*************************************************************************
  ceet_data * thresh_data;  /* ceet data pointer */

  thresh_data = ceet_create(NULL); /*  when ceet_create() is called */



  1.  If thresh_data->peak_params_p is NULL, thresh_data->peak_params_p will
      be allocated and initialized as follows:

      thresh_data->peak_params->area = CIP_PEAK_AREA_4PT;
      thresh_data->peak_params->type = CIP_PEAK_SINGLE;
      thresh_data->peak_params->user_fnp = NULL;
      thresh_data->peak_params->user_params = 0;
      thresh_data->peak_params->peaks_per_buffer = 0;
      thresh_data->peak_params_p->threshold =0;
      thresh_data->peak_params_p->flags = CIP_PEAK_FLAG_ASYMMETRIC;

  2.  If thresh_data->edge_params_p is NULL, thresh_data->edge_params_p will
      be allocated and initialized as follows:

      thresh_data->edge_params_p->num_bits_pel = 8;
      thresh_data->edge_params_p->num_bits_xy = 7 ;
      thresh_data->edge_params_p->num_bits_mag = 8;
      thresh_data->edge_params_p->num_bits_ang = 8;
      thresh_data->edge_params_p->xy_compress_type = CIP_EDGE_MAP_LINEAR;
      thresh_data->edge_params_p->mag_compress_type = CIP_EDGE_MAP_LINEAR;
      thresh_data->edge_params_p->output_type = CIP_EDGE_OUTPUT_MAG;
      thresh_data->edge_params_p->flags = 0;
      thresh_data->edge_params_p->xy_compress_map_p = NULL;
      thresh_data->edge_params_p->mag_compress_map_p = NULL;
      thresh_data->edge_params_p->setup_rej_pct = 5;
      thresh_data->edge_params_p->run_rej_pct = 0;
      thresh_data->edge_params_p->rtail_n = 0;
      thresh_data->edge_params_p->mapping_p = NULL ;
      thresh_data->edge_params_p->peak_params_p = thresh_data->peak_params_p;
      thresh_data->edge_params_p->peak_list_pp = NULL;

      If a non-VC2 system is created (e.g. via cas_save_system()) on a
      system with VC2, change the <edge_params_p->flags>

        thresh_data->edge_params_p->flags |= CIP_EDGE_FLAG_INHIBIT_VC2; 2;

      and call ceet_create() again.


  3.  If thresh_data->edge_results_p is NULL, thresh_data->edge_results_p
      will be allocated and cleared.

  4.  Do not allocate <thresh_data->edge_data_p>. If it exists, ceet_create()
      deallocates it because cip_sobel_init() returns every time a newly
      initialized thresh_data->edge_data_p from the heap.


*************************************************************************/

#ifdef __cplusplus
}
#endif
#endif /* !c_ceet_defs_h */
```

App P 3 ceet_edge.c@@/main/5

1

```
/*
 *
 *      Copyright (c) $Date: Mon Oct 24 14:54:00 1994$
 *      Cognex Corporation, Needham, MA 02194
 *
 *      $Source: ceet_edge.c$
 *      $Revision: /main/4$
 *      $Locker: yoshi$
 *
 */

/*****************************************************************************\
 *
 * Cognex Edge Emphasized Threshold
 *
\*****************************************************************************/

#ifndef c_ceet_if_h
#include <ceet_if.h>
#endif

#ifndef c_cvc_h
#include <cvc.h>
#endif

#ifndef c_chp_h
#include <chp.h>
#endif

#ifndef c_cif_def_h
#include <cif_def.h>
#endif

#ifndef c_cu_def_h
#include <cu_def.h>
#endif

#ifndef c_cip_mmax_h
#include <cip_mmax.h>             /* CIP_MINMAX_MIN */
#endif

#ifndef c_ctm_h
#include <ctm.h>                  /* ctm_timer */
#endif

#ifndef c_cct_h
#include <cct.h>                  /* COGM_ERR_BREAKNO - via cgen_er.h */
#endif

#ifndef c_cgr_zoom_h
#include <cgr_zoom.h>             /* scroll/zoom  graphics */
#endif

#ifndef c_csys_cfg_h
#include <csys_cfg.h>             /* vc2_present */
#endif

#ifndef c_assert_h
#include <assert.h>
#endif

/*
 *  For speed, Cognex internal function cip_minmax() is used if VC2 is
 *  present. The last two arguments of the function are not implemented
 *  but NULL pointers must be passed to prevent errors. The following
 *  prototype is necessary (no protypes in a header file).
 */

extern cip_buffer *cip_minmax PROTO ((cip_buffer*,cip_buffer*,cip_buffer*,
                                      cip_buffer*,unsigned char *,
                                      cip_minmax_mode, int *, int *));

/*
 *  If VC2 is not available, cip_minmax() is not called because of its
 *  incompatible results. Instead, cip_min() is used.
 */


/*
 * Purpose of <ceet_data.internal>
 *
 * If ceet_create() allocates specified data structures, their
 * corresponding bits in <ceet_data.internal> will be set.
 * ceet_delete() deallocates data structures only if they have been
 * allocated by ceet_create(). <ceet_data.internal> is used for
 * this book keeping.
 *
 * VC2's presence and absence can be checked CEET_VC2_PRESENT bit
 * of <ceet_data.internal>.
 */
#define CEET_EDGE_PARAMS   0x0001  /* for cip_edge_params */
#define CEET_PEAK_PARAMS   0x0002  /* for cip_peak_params */
#define CEET_EDGE_DATA     0x0004  /* for cip_edge_data */
#define CEET_EDGE_RESULTS  0x0008  /* for cip_edge_results */
#define CEET_CEET_DATA     0x0010  /* for ceet_data */
#define CEET_VC2_PRESENT   0x0100  /* this bit is set if VC2 is present */


/* Local functions */
void ceet_print_hist PROTO ((FILE * out, const int* hist, const char * text));
void ceet_show_image PROTO((FILE * out, cgrz_tablet * tablet,
                            const cip_buffer * image, const char * text));

/*****************************************************************************\
 *
 * ceet_create
 *
\*****************************************************************************/
ceet_data *  ceet_create( td )
     ceet_data * td;
{
  cct_signal    signal;
  ceet_data * volatile xtd;

  xtd = td;

  if ((signal = cct_catch(0)))
    {
      if(td->internal & CEET_CEET_DATA) ceet_delete(xtd);
      cct_throw (signal);
    }

/*
 *  If any of pointers to data structures are NULL, allocate them and
 *  initialize.
 */

  if(!td)
    {
      td = xtd = (ceet_data * ) cvc_alloc(sizeof(ceet_data));
```

App P4 ceet_edge.c@@/main/5

1

```
      td->internal = CEET_CEET_DATA;                      /* initialize */
      cu_clear(td,sizeof(ceet_data)-sizeof(int)); /* don't erase <interal> */
    }

  if(!td->peak_params_p)          /* peak_params */
    {
      cip_peak_params *  peak_params_p;

      peak_params_p (cip_peak_params *)cvc_alloc(sizeof(cip_peak_params));
      td->internal |= CEET_PEAK_PARAMS; /* update */
      td->peak_params p = peak_params_p;
      peak_params_p->area = CIP_PEAK_AREA_4PT;
      peak_params_p->type = CIP_PEAK_DOUBLE;
      peak_params_p->user_fnp = NULL;
      peak_params p->user_params = 0;
      peak_params_p->peaks_per_buffer = 0;
      peak_params_p->threshold =0;
      peak_params_p >flags = CIP_PEAK_FLAG_ASYMMETRIC;
    }

  if(!td->edge_results p)  /* edge_results */
    {
      td->edge_results_p =
        (cip_edge_results *)cvc_alloc(sizeof(cip_edge_results));
      td->internal |= CEET_EDGE_RESULTS;
      cu_clear(td->edge_results_p,sizeof(cip_edge_results));
    }

  if(!td->edge_params_p)  /* edge_params */
    {
      cip_edge_params * edge_params_p;

      edge_params_p = (cip_edge_params *) cvc_alloc(sizeof(cip_edge_params));
      td->internal |= CEET_EDGE_PARAMS; /* update */
      cu_clear(edge_params_p, sizeof(cip_edge_params));
      td->edge_params_p = edge_params_p;

      edge_params_p->num_bits_pel = 8;
      edge_params_p->num_bits_xy = 7 ;
      edge_params_p->num_bits_mag = 8;
      edge_params_p->num_bits_ang = 8;
      edge_params_p->xy_compress_type = CIP_EDGE_MAP_LINEAR;
      edge_params_p->mag_compress_type = CIP_EDGE_MAP_LINEAR;

      edge_params_p->output_type = CIP_EDGE_OUTPUT_MAG;
      edge_params_p->flags = 0;
      edge_params_p->xy_compress_map_p = NULL;
      edge_params_p->mag_compress_map_p = NULL;
      edge_params_p->setup_rej_pct = 5;
      edge_params_p->run_rej_pct = 0;
      edge_params_p->tail_n = 0;
      edge_params_p->mapping_p = NULL ;
      edge_params_p->peak_params_p = td->peak_params_p;
      edge_params_p->peak_list_pp = NULL;
    }

/*
 * Setup the edge detection data structure.
 * cip_sobel_init() allocates a cip_edge_data structure from the heap.
 * Free if old data structure exists.
 */

  if(td->edge_data_p) cip_edge_free(td->edge_data_p);
  td->edge_data_p = cip_sobel_init(td->edge_params_p);
  td->internal |= CEET_EDGE_DATA; /* update */
```

2

```
/* check VC2 */
  {
    csys_config   config;
    csys_get_config(&config);
    if (config.vc2_present) td->internal |= CEET_VC2_PRESENT;
    else td->internal &= ~CEET_VC2_PRESENT;
  }


  return td;
}

static void free_edge_results(ceet_data *td)
{
    if (td && td->internal & CEET_EDGE_RESULTS)  /* edge_resulsts_p */
    {
       cip_edge_results * erp;

       erp = td->edge_results_p;
       if (erp->mag_img_p) cip_delete(erp->mag_img_p);
       if (erp->ang_img_p) cip_delete(erp->ang_img_p);
       if (erp->x_img_p)   cip_delete(erp->x_img_p);
       if (erp->y_img_p)   cip_delete(erp->y_img_p);
       free(erp);
       td->internal &= (~CEET_EDGE_RESULTS);
    }
}

/************************************************************************\
 *
 * ceet_delete
 *
\************************************************************************/
void ceet_delete.(td)
       ceet_data * td;
{

   if(td == NULL) return;


   if(td->internal & CEET_PEAK_PARAMS)
     {
       free(td->peak_params_p);
       td->internal &= (~CEET_PEAK_PARAMS);
     }

   free_edge_results(td);

   if(td->internal & CEET_EDGE_PARAMS )
     {
       free(td->edge_params_p);
       td->internal &= (~CEET_EDGE_PARAMS);
     }

   if(td->internal & CEET_EDGE_DATA )
     {
       cip_edge_free(td->edge_data_p);
       td->internal &= (~CEET_EDGE_DATA);
     }
   if(td->internal & CEET_CEET_DATA)
     {
       free (td);
     }
```

App P5 ceet_edge.c@@/main/5

3

```
}

/***********************************************************************\
 *
ceet_edge_threshold
 *
\***********************************************************************/

#define MAX_TABLE (256*2)
#define HIGHS 255,255,255,255,255,255,255,255,255,255,255,255,255,255,255,255,\
              255,255,255,255,255,255,255,255,255,255,255,255,255,255,255,255,\
              255,255,255,255,255,255,255,255,255,255,255,255,255,255,255,255,\
              255,255,255,255,255,255,255,255,255,255,255,255,255,255,255,255

#define ZEROS 0,0,0,0,0,0,0,0,0,0,0,0,0,0,0,0,0,0,0,0,0,0,0,0,0,0,0,0,0,0,0,0,\
              0,0,0,0,0,0,0,0,0,0,0,0,0,0,0,0,0,0,0,0,0,0,0,0,0,0,0,0,0,0,0,0

int ceet_edge_threshold (image, tp, td, tr_pp)
     cip_buffer * image;
     ceet_params * tp;
     ceet_data * td;
     ceet_results ** tr_pp;
{
  cip buffer * mag_image = NULL;  /* Not used in catch, don't make volatile */
  cip_buffer * volatile win_min = NULL;

  ceet_results * volatile results=NULL;
  egrx_tablet * tablet;
  FILE * out;
  cct_signal signal;
  ctm_timer timer;
  int threshold;
  int tm[4];
  int * volatile hist = NULL;
  int i, sum, wt_sum;
  int * hp;
  int non_zero;
  int limit, subtotal;
  int diag_flags;

  /*
   * ttable is a threshold map table (0,0,0,...,0,255,...,255,255)
   * map is a subset in ttable such that
   *          map[i] = 0   for i=0 to threshold-1,
   *                 = 255 for i=threshold to 255.
   */
  static unsigned char ttable[MAX_TABLE] = {ZEROS,ZEROS,ZEROS,ZEROS,
                                            HIGHS, HIGHS, HIGHS, HIGHS};
  unsigned char * map;

   if ((signal = cct_catch(0)))
   {
     if (results) {free(results); results=NULL;}
     if (win_min) {cip_delete(win_min); win_min = NULL; }
     if (hist)      {free(hist); hist = NULL;}
     free_edge_results(td);

     cct_throw (signal);
   }

/*
 * Check argument errors
 */
 if(!(td && tp &&image)) cct_error (COGN_ERR_BADARG);

/*
 * Assign diagnostics resources. If no resources were assigned, turn off flags.
 */
  diag_flags = tp->diag_flags;

  tablet = tp->diag_content->tablet;
  if(!tablet) diag_flags &= (~CEET_SHOW_IMAGE);

  out = tp->diag_content->textout;
  if(!out) diag_flags &=
    ~(CEET_PRINT_TIMER | CEET_PRINT_INTERNAL | CEET_PRINT_HISTOGRAM);

/*
 * check the validity of sobel_top
 */
 assert(tp->sobel_top > 0.0 &&  tp->sobel_top <= 1.0 );

/*
 * Create the results structure if wanted
 */

 if(tr_pp) /* if not NULL, create it */
   {
     results = (ceet_results *) cvc_alloc(sizeof(ceet_results));
     *tr_pp = results;
   }

/*
 * Clear all hanging data structures and do Sobel
 */

 ctm_begin(&timer);
 {
   cip_edge_results * erp;

   erp = td->edge_results_p;

   if (erp->mag_img_p) cip_delete(erp->mag_img_p);
   if (erp->ang_img_p) cip_delete(erp->ang_img_p);
   if (erp->x_img_p)   cip_delete(erp->x_img_p);
   if (erp->y_img_p)   cip_delete(erp->y_img_p);
 }
 cip_sobel (image, td->edge_data_p, td->edge_results_p);
 tm[0]=ctm_read(&timer);

/*
 * Histogram of Sobel image
 */

 ctm_begin(&timer);
 mag_image = td->edge_results_p->mag_img_p;
 hist =cip_zhist(mag_image,NULL);
 if(tr_pp) cu_copy(hist,(*tr_pp)->hist sobel,256*sizeof(int));
 tm[1]=ctm_read(&timer);

/* debug */
 if(diag_flags & CEET_PRINT_HISTOGRAM)
   ceet_print_hist(out, hist, "Sobel Image");

/*
 * Find threshold for Sobel
 */

 ctm_begin(&timer);
 limit = tp->sobel_top * (mag_image->width * mag_image->height - hist[0]);
```

App. P6 ceet_edge.c@@/main/5

4

```
for(threshold = 255, subtotal = 0, hp=&hist[255];
    subtotal < limit ;
    threshold--, subtotal += *hp--);

map = &table[256-threshold]; /* starting address of a map array */

/*
 * if VC2 is present, use the cip_minmax version
 */
 if (td->internal & CEET_VC2_PRESENT)
   {
     win_min = cip_minmax(mag_image,image,NULL,NULL,map,CIP_MINMAX_MIN,0,0);
   }

 else  /* if VC2 is absent, use the cip_min version */
   {
     cip_buffer * bin_image=0;

     bin_image=cip_create(mag_image->width,mag_image->height,8);
     cip_pixel_map(mag_image,bin_image,map);
     win_min = cip_min(bin_image,image,NULL);
     if(bin_image) {cip_delete (bin_image); bin_image=NULL;}
   }
 tm[2]=ctm_read(&timer);

/* debug */
  if(diag_flags & CEET_PRINT_INTERNAL)
    {
      fprintf(out,"sobel threshold %d\n", threshold);
      fprintf(out, "total pixels = %d top (%.1f) = %d, hist[0] = %d\n",
              mag_image->width * mag_image->height, tp->sobel_top,
              limit, hist[0]);
    }

/*
 * Histogram of the edge emphasized image
 */
 ctm_begin(&timer);
 cip_shist(win_min,hist);
 if(tr_pp) cu_copy(hist, (*tr_pp)->hist_edge, 256*sizeof(int));
 tm[3]=ctm_read(&timer);

  debug */
  if(diag_flags & CEET_PRINT_HISTOGRAM)
    ceet_print_hist(out, hist, "Edge Emphasized Image");


/*
 * Compute a sum of hist[i]*i for i=1,255 excluding hist[0]
 */
 ctm_begin(&timer);
 for (sum=wt_sum=0, hp=&hist[255], i=255; i>0; i--) /*  do not include i=0 */
   {
     sum += * hp--;
     wt_sum += sum;
   }
 non_zero =win_min->width * win_min->height - hist[0];

/*
 * Compute an average. If non_zero part is empty, set threshold to -1

 threshold = non_zero != 0? wt_sum /non_zero : -1;
  tm[4]=ctm_read(&timer);

/* debug */
  if(diag_flags & CEET_SHOW_IMAGE)
    {
      ceet_show_image(out,tablet,mag_image,"Examine Sobel Image");
      ceet_show_image(out,tablet,win_min,"Examine Edge Emphasized Image");
    }
  if(win_min) {cip_delete (win_min); win_min=NULL;}

  if(tr_pp)
    {
      cu_copy(tm, (*tr_pp)->time, 5*sizeof(int));
      (*tr_pp)->time[5] = tm[0]+tm[1]+tm[2]+tm[3]+tm[4];
    }

  if(hist) {free(hist);  hist=0 ; }

  return threshold;
}

#undef MAX_TABLE
#undef MIONS
#undef ZEROS


/**********************************************************************\
 *
 * ceet_print_hist
 *
 *  print histogram
\**********************************************************************/
void ceet_print_hist (out,hist, text)
     FILE * out;
     const int * hist;
     const char * text;
{
  const int * hp;
  int i;

  fprintf(out,"Histogram of %s\n", text);
 {
 {
   int zero_count = 0;

   for(i=0, hp=hist ;i< 256;i++, hp++)
     {
       if(*hp)
         {
           if (zero_count > 1) fprintf(out,"[%d - %d]\t0\n",i-zero_count,i-1);
           else if (zero_count == 1] fprintf(out,"[%d]\t\t0\n",i-1);
           fprintf(out,"[%d]\t\t%d\n",i,*hp);
           zero_count = 0;
         }
       else  zero_count++;
     }
   if(zero_count > 1) fprintf(out,"[%d - %d]\t0\n",i-zero_count,i-1);
   else if (zero_count == 1) fprintf(out,"[%d]\t\t0\n",i-1);
 }
}


/**********************************************************************\
 *
 * ceet_show_image
 *
\**********************************************************************/
```

App P 7 ceet_edge.c@@/main/5

5

```
void cee_show_image (out, tablet, image, text)
     FILE * out;
     cgrx_tablet * tablet;
     const cip_buffer * image;
     const char * text;
{
   cip_buffer * volatile image_copy = tablet->src;
   double scroll_x = 0.0;
   double scroll_y = 0.0;
   double zoom - 1.0;
   cct_signal signal;

   if ((signal = cct_catch(0)))
   {
     goto cleanup;
   }

   if (out)
   {
      fprintf(out,"%s\n", text);
      fprintf(out,"\t<LEFT> accept; <MIDDLE> or "
               "<RIGHT>toggle size/location\n");
   }

  cgrx_get_scroll (tablet. &scroll_x, &scroll_y);
  zoom = cgrx_get_zoom (tablet);
  cgrx_setup (tablet, (cip_buffer *)image, tablet->dst.
               scroll_x, scroll_y, zoom);
  cgrx_copy (tablet);
  cif_tb3_flush();
  do { } while(cgrx_scroll_zoom(tablet));
  cgrx_get_scroll (tablet, &scroll_x, &scroll_y);
  zoom = cgrx_get_zoom (tablet);

 cleanup:
  if(image_copy != tablet->src)
  { /* Restore original image */
     cgrx_setup (tablet, image_copy, tablet->dst,
                 scroll_x, scroll_y, zoom);
  }

  if(signal) cct_throw (signal);
}

#undef CEET_VC2_PRESENT
#undef CEET_PEAK_PARAMS
#undef CEET_EDGE_RESULTS
#undef CEET_EDGE_PARAMS
#undef CEET_EDGE_DATA
#undef CEET_CEET_DATA
```

App P8 ceet_demo.c

1

```
/*
 *
 *      Copyright (c) $Date$
 *      Cognex Corporation, Needham, MA 02194
 *
 *      $Source$
 *      $Revision$
 *      $Locker$
 *
 */



/**** UNSUPPORTED ********** UNSUPPORTED ********** UNSUPPORTED *****\
 *********************************************************************
 *  ceet_demo()
 *
 *      This is a demo program for ceet, edge emphasized threshold
 *      To run this program the following modules are required.
 *
 *      ceet test          -  ceet edge, ceet_util
 *      quick blob test    -  test_blob, cip_binarize, vall_iorega
 *
 *      Set a trackball port in the "#define TRACK_BALL" line below.
 *
 *********************************************************************
\**** UNSUPPORTED ********** UNSUPPORTED ********** UNSUPPORTED *****/




static  char     *header = "$Header$";
#ifndef c_ceet_if_h
#include <ceet_if.h>
#endif

#ifndef c_ceet_util_h
#include "ceet_util.h"
#endif

#ifndef c_cquickb_h
#include <cquickb.h>
#endif

extern void ceet_test_blob PROTO((ceet_params *,
                                  cip_buffer * win_p,
                                  int threshold,
                                  int x_offset, int y_offset));

extern void ceet_print_hist PROTO ((FILE * out, int* hist, char * text));
#define TRACK_BALL "/dev/ser2"

/* global */

extern ceet_debug;

/*********************************************************************\
 *
 * ceet_demo
 *
\*********************************************************************/
void ceet_demo()
{
  ctrz_tablet   tablet;
  ctbl_obj      * ctbl;
  int           hp_start, free_start, hpb;
  cip_buffer  * win_original = NULL;
  cip_buffer  * win_src = NULL;
  cip buffer  * bin_image = NULL;
  cip_buffer  * win_blob = NULL;
  FILE * out;
  cct_signal    signal;

  ctm_timer     timer;
  int   t       tm;
  ceet_data     thresh_data;
  ceet_params   thresh_params;
  ceet_results * thresh_results_p;
  int           x_offset, y_offset;
  cd_resources  diag_context;

  unsigned char           map[256];
  int i;
  int   threshold;
  static int color = 255 ;
  int   more = 1;

/* save heap numbers for heap leak test */
  hp_start = chp_alloc_total;
  free_start = chp_free_total;
  hpb = 0;

/* cleanup before error unwinding */

  if (signal = cct_catch(0)) goto cleanup;


/* get trackball */

  ctbl_get_ctbl(TRACK_BALL);

/* setup for thresholding and find the threshold value*/

  ctm_begin(&timer);
  thresh_data.internal=0; /* clear internals */
  thresh_data.edge_data_p=0;
  thresh_data.edge_params_p=0;
  thresh_data.edge_results_p=0;
  thresh_data.peak_params_p=0;
  ceet_create (&thresh_data);
  tm = ctm_read(&timer);

/* set debugging mode */

  thresh_params.diag_flags = ceet_debug;
  diag_context.textout = stdout;

  thresh_params.diag_context = &diag_context;

  out=thresh_params.diag_context->textout;

  if(thresh_params.diag_flags & CEET_PRINT_TIMER)
      fprintf (out, "ceet_setup time %d\n", tm);

/* start of image loop */

  while(more)
    {

/* get an image */
```

ceet_demo.c

2

```c
        win_src = ceet_get_image(&tablet, ctb), &x_offset, &y_offset);
        diag_context.tablet = &tablet;

        win_original = cip_copy(win_src, NULL);

        thresh_params.sobel_top = 0.4;

        threshold = ceet_edge_threshold (win_src,
                                         &thresh_params,
                                         &thresh_data,
                                         &thresh_results_p);
       fprintf (out,"thershold %d\n", threshold);

       if(thresh_params.diag_flags & CEET_PRINT_TIMER)
         {
           int * time;
           time = thresh_results_p->time;

           fprintf(out,"                    sobel time %5d\n",
                   time[CEET_TIME_SOBEL]);
           fprintf(out,"        sobel histogram time %5d\n",
                   time[CEET_TIME_SOBEL_HIST]);
           fprintf(out,"                  masking time %5d\n",
                   time[CEET_TIME_MASK]);
           fprintf(out,"         image histogram time %5d\n",
                   time[CEET_TIME_IMAGE_HIST]);
           fprintf(out,"               threshold time %5d\n",
                   time[CEET_TIME_THRESHOLD]);
           fprintf(out,"         ------------------------------\n");
           fprintf(out,"       ceet_edge total time %5d\n",
                   time[CEET_TIME_TOTAL]);

         }

      if(threshold <0)
        {
          fprintf(out,"Error - threshold indeterminate (probably no edges)\n");
        }
      else
        {

/* display binarized image */
             cw_clear(map,256);
             for(i=threshold;i<256;i++) map[i]=255;
             bin_image=cip_create(win_original->width,win_original->height,8);
             cip_pixel_map(win_original,bin_image,map);
             cip_copy(bin_image,win_src);
             cgrs_copy (&tablet);
             ctb3_flush(ctb3, CTB3_SERIAL);
             fprintf(out, "Examine binary images. Use Trackball \n");
             fprintf(out,
             "    <LEFT> = accept, <MIDDLE> = zoom out,  <RIGHT> = zoom in\n");
             do { } while(cgrs_scroll_zoom(&tablet));

/* select window for blob */

             cip_copy (win_original, win_src);
             cgrs_copy (&tablet);
             fprintf(out, "Set view for blob. Use Trackball for scroll/zoom \n");
             fprintf(out,
             "    <LEFT> = accept, <MIDDLE> = zoom out,  <RIGHT> = zoom in\n");
             cif_tb3_flush();
             do { } while(cgrs_scroll_zoom(&tablet));

             fprintf(out,"Select window for blob. Use Trackball \n");
             fprintf(out,
             "    <LEFT> = accept, <MIDDLE> or <RIGHT> = toggle size/location\n");
             win_blob = select_blob_window (&tablet, ctb), &x_offset, &y_offset);
/* blob test */


             ceet_test_blob (&thresh_params, win_blob, threshold,
                             x_offset, y_offset);

          }

/* put video back into realtime */
        caq_realtime();


/* print out histogram */
        if(thresh_params.diag_flags & CEET_PRINT_HISTOGRAM)

          {
            int *hist;
            hist=cip_zhist(win_original,NULL);
            ceet_print_hist(out, hist, "Original Image");
            free(hist);
          }

        if(win_src) {cip_delete (win_src); win_src=NULL;}
        if(win_blob) {cip_delete (win_blob); win_blob=NULL;}
        if(win_original) {cip_delete (win_original); win_original=NULL; }
        if(bin_image) {cip_delete (bin_image); bin_image=NULL;}
        if(tablet.src) {cip_delete (tablet.src); tablet.src=NULL;}
        if(thresh_results_p) {free(thresh_results_p); thresh_results_p=NULL;}
        fprintf(out,"\nMore images ? Exit (0) or More (1) : ");
        scanf("%d",&more);
    }  /* end of image loop */


cleanup:  /* both normal and abnormal (cet_error) terminations end up here */

 if(win_src) {cip_delete (win_src); win_src=NULL;}
 if(win_blob) {cip_delete (win_blob); win_blob=NULL;}
 if(win_original) {cip_delete (win_original); win_original=NULL; }
 if(bin_image) {cip_delete (bin_image); bin_image=NULL;}
 if(tablet.src) {cip_delete (tablet.src); tablet.src=NULL;}
 cdb_exit();
 ctm_begin(&timer);
 ceet_delete (&thresh_data);
 tm= ctm_read(&timer);
 if(thresh_params.diag_flags & CEET_PRINT_TIMER)
   fprintf(out, "ceet_cleanup time %d\n",tm);
 if(signal) cct_throw (signal);


 if(heap_balance (hp_start, free_start, hpb, "at the end"))
   {
     fprintf (out,
   "Heap balance may not be zero for the first time camera or idb is used\n");
   }


}
```

App P10 ceet_util.h

1

```
/*
 *
 *      Copyright (c) $Date$
 *      Cognex Corporation, Needham, MA 02194
 *
 *      $Source$
 *      $Revision$
 *      $Locker$
 *
 */

#ifndef c_ceet_util_h
#define c_ceet_util_h

#ifndef c_ansiprot_h
#include <ansiprot.h>
#endif

#ifdef __cplusplus
extern "C" {
#endif

#ifndef c_ceet_if_h
#include <ceet_if.h>
#endif

#ifndef c_chp_h
#include <chp.h>
#endif

#ifndef c_cgr_zoom_h
#include <cgr_zoom.h>
#endif

#ifndef c_cdb_defs_h
#include <cdb/cdb_defs.h>
#endif

#ifndef c_ctb3_h
#include <ctb3.h>
#endif

#ifndef c_caq_caq_def_h
#include <caq/caq_def.h>
#endif


#define CEET_HIST_OUTLINE 1
#define CEET_HIST_LOG_SCALE 2   z
#define CEET_HIST_ZERO_IN 4
#define CEET_HIST_HIGH_IN 8
#define CEET_HIST_PRINT 0x10

extern ctb3_obj * get_ctb3 PROTO ((char*));
extern cip_buffer * ceet_get_image PROTO((cgrs_tablet * t, ctb3_obj * ctb3_p,
                                  int * x_offset, int * y_offset));


extern cip_buffer * get_db_image PROTO((char * infile, int rec));

extern cip_buffer * select_blob_window PROTO ((cgrs_tablet * tablet,
                                               ctb3_obj * ctb3,
                                               int *x_offset, int *y_offset));


extern void ceet_manual_threshold PROTO((cip_buffer * image,
                                         cgrs_tablet * tablet,

                                         int flags));



extern void ceet_draw_histogram PROTO((cip_buffer * image,
                                       cgrs_tablet * tablet,
                                       int width, int height,
                                       int color, int flags));



extern int heap_balance PROTO ((int hp_start,int free_start, int hpb,
                                char * string));


#ifdef __cplusplus
}
#endif
#endif /* !c_ceet_util_h */
```

App P11 cerj_util.c

1

```
/*
 *
 *      Copyright (c) $Date$
 *      Cognex Corporation, Needham, MA 02194
 *
 *      $Source$
 *      $Revision$
 *      $Locker$
 *
 */

static char    *header = "$Header$";

#ifndef c_ceet_util_h
#include "ceet_util.h"
#endif

typedef struct box
    {
      int ulx, uly, width, height.
    } box;


static void place_box PROTO((cgrs_tablet * t, box * w,ctb3_obj * ctb3_p));
static void draw_box PROTO ((cgrs_tablet * t, box * w, int color));


/***********************************************************************\
 *
 * get_ctb3
 *
\***********************************************************************/
ctb3_obj * get_ctb3(tb_dev)
     char * tb_dev;

{
  ctb3_obj       * ctb3;

  if (cif_tb_file != NULL)
    {
    fclose(cif_tb_file);
    cif_tb_file = 0;
    }
   * Initialize the trackball facility */
  cif_tb_file = cif_open_tb(tb_dev);
  ctb3 = ctb3_from_cif_tb3();
  ctb3->msecs = 60000;
  ctb3->to_data.dx = 0;
  ctb3->to_data.dy = 0;
  ctb3->to_data.buttons = CTB3_LEFT;
  ctb3_new_queue(ctb3, 100);
  ctb3_mode(ctb3, CTB3_SERIAL);/* | CTB3 TIMER | CTB3_REMOTE | CTB3_KEYBOARD */
  ctb3_flush(ctb3, CTB3_SERIAL);
  return ctb3;
}


/***********************************************************************\
 *
 * ceet_get_image
 *
\***********************************************************************/

cip_buffer * ceet_get_image(tablet_p, ctb3_p, x_offset, y_offset)
     cgrs_tablet * tablet_p;
     ctb3_obj * ctb3_p;
     int * x_offset, * y_offset;

{
  cip_buffer            * src = NULL;
  cip_buffer            * dst = NULL;
  cip_buffer            * my_window_p ;
  int                   from_idb;
  char                  infile[30];
  int                   rec;

  box                   my_box;
  static int color = 255 ;
  cct_signal            signal;


  NO_REGISTER (src);
   if (signal = cct_catch(0))
   {
       if (src ) cip_delete(src);
       cct_throw (signal);
   }

#if C_BOARD == C_VM13 ||  C_BOARD == C_VM14 || C_BOARD == C_VM16
  caq_mode->eightbit_enable = 1;
  caq_video_mode = 1;
#elif C_BOARD == C_VM17
#else
    ()  // Generate compile-time error
#endif

  caqcinit();

  printf("Image from camera (0) or idb (1) ? ");
  scanf("%d", &from_idb);

  if(from_idb)
    {

      cdb_init();
      cfs_init();
      cip_set(caq_image,128);
      caq_display();

      do
        {
          printf("File name : ");
          scanf("%s",infile);
          printf("Record # : ");
          scanf("%d",&rec);
          src=get_db_image(infile, rec);
        } while (!src);



    }
  else
    {
      src= cip_create (caq_image->width, caq_image->height, 8);
      caq_acquire(caq_mode);
      cip_copy (caq_image, src);
      caq_display();
    }

  dst = caq_image;
```

App P 12 ceet_util.c

2

```
    cgrz_setup(tablet_p, src, dst, src->width/2 0,  src->height/2 0, 1.);
    tablet_p->black = CAQ_BLACK;
    cgrz_overrides.do_pelvalues=1;
    cgrz_copy(tablet_p);

    printf("Set view. Use trackball for scroll/zoom \n");
    printf("   <LEFT> = accept, <MIDDLE> = zoom out,  <RIGHT> = zoom in\n");
    cif_tb3_flush();
    do { } while(cgrz_scroll_zoom(tablet_p));

    my box.width = 200; /*512;*/
    my box.height = 200; /* 480;*/
    my_box.ulx = (src->width - my_box.width)/2;
    my_box.uly = (src->height - my_box.height)/2;

    printf("Set window for threshold. Use trackball\n");
    printf("   <LEFT> = accept. <MIDDLE> or <RIGHT> = toggle size/location\n");

    place_box (tablet_p, &my_box, ctb3_p);
    draw_box(tablet_p, &my_box, color);

   my window_p = cip_window(tablet_p->src, NULL,
                          my_box.ulx, my_box.uly,
                          my_box.width, my_box.height);

    * x_offset = my_box.ulx;
    * y_offset = my_box.uly;

    return my_window_p;
}

/*********************************************************************\
 *
 * get_db_image
 *
\*********************************************************************/
cip_buffer * get_db_image(infile,rec)
char *infile ;
int rec ;
{ int fd,i ;
  cip_buffer *img=0, *img_copy=0;
  cct_signal signal;

    if((signal=cct_catch(0)))
      {
        goto cleanup;
      }

    fd=cdb_open(infile,"r");
    printf("filename : %s  rec # %d\n",infile,rec);

    if (rec)
      {
        i=cdb_seek(fd,rec,CDB_SO_ABC);
        if (i >= 0) img=cdb_get_image(fd,0,0);
        else
          {
            printf("file doesn't contain that many images  %d\n",rec);
            cdb_close(fd);
            return 0;
          }
      }
    else
      img=cdb_get_image(fd,0,0) ;

/* make PASTE image */
  img copy = cip_create(img->width, img->height, 8);
  cip_copy(img, img_copy);
  printf("Image size (%d,%d) depth %d\n",img->width,img->height,img->depth);
  cdb_close(fd);
  return img_copy;

 cleanup:
  if(img_copy)  { cip_delete(img_copy); img_copy=NULL; }

  switch (signal)
    {
/* recoverable errors */
        case CDB_ERR_BADFD:  printf("Bad file name (%s)",infile); break;
        case CDB_ERR_OPEN:   printf("Bad drive name (%s)",infile); break;
        case CDB_ERR EOF:    printf("Passed end of file (rec # %d)",rec); break;
/* other errors, unwind */
      defaults:
         cct_throw(signal);
    }
  printf(" -> Try again\n");
  return 0;
}

/*********************************************************************\
 *
 * place_box
 *
\*********************************************************************/
static void place_box (tablet_p, window_p, ctb3_p)
      cgrz_tablet * tablet_p;
      box * window_p;
      ctb3_obj * ctb3_p;
{
  ctb3_data tb;
  enum {trans=0, resize} box_mode ;

  static int color = 255 ;

  box_mode=trans;

  cgrz_copy(tablet_p);  /* get a fresh copy */
  cif_tb3_flush();
  do
    {
      draw_box(tablet_p, window_p, color);
      ctb3_read (ctb3_p, &tb);

      if(tb.buttons & CTB3_RIGHT || tb.buttons & CTB3_MIDDLE)
        /* mode changes */
        {
          box_mode = (box_mode+1)%2;
        }

      if(tb.dx || tb.dy)            /* update box */
        {
          switch (box_mode)
            {
              case trans:
                  window_p->ulx += tb.dx;
                  window_p->uly -= tb.dy;
                  break;
              case resize:
                  window_p->width += tb.dx;
                  window_p->height -= tb.dy;
```

App P13 ceet_util.c

3

```
                        break;
                }
            }
            ctm_delay(100);
        } while (!(tb.buttons & CTB3_LEFT));

}

/***********************************************************************\
 *
 * draw_box
 *
\***********************************************************************/
static void draw_box(t, w, color)
        cgrx_tablet * t;
        box * w;
        int color;
{
    int i,j;

    double qx[4], qy[4];

    qx[0] = qx[3] = (double) w->ulx;
    qy[0] = qy[1] = (double) w->uly;
    qx[1] = qx[2] = qx[0] + w->width;
    qy[2] = qy[3] = qy[0] + w->height;

    cgrx_copy (t);

    for(i=0, j=1; i<4; ++i, j=(i+1)%4)
      {
        cgrx_line (t,qx[i],qy[i],qx[j],qy[j], color);
      }
}


/***********************************************************************\
 *
 * heap_balance
 *
\***********************************************************************/

int
heap_balance(hp_start, free_start, hpb, string)
int hp_start, free_start, hpb;
char * string;


{
   int heap_balance = chp_allor_total - chp_free_total - hp_start + free_start;

   printf("heap balance %d (%d)   %s\n", heap_balance, heap_balance-hpb, string);
   return heap_balance;

}

/***********************************************************************\
 *
 * select_blob_window
 *
\***********************************************************************/
cip_buffer * select_blob_window(tablet,ctb3,x_offset,y_offset)
        cgrx_tablet * tablet;
        ctb3_obj * ctb3;
        int * x_offset;
        int * y_offset;
{
  box my_box;
  cip_buffer * win_blob;
  int color = 255;

  if(!(tablet && ctb3 && x_offset && y_offset)) cct_error (CGEN_ERR_BADARG);
  my_box.width =  512;
  my_box.height = 480;
  my_box.ulx = (tablet->src->width - my_box.width)/2;
  my_box.uly = (tablet->src->height - my_box.height)/2;

  place_box (tablet, &my_box, ctb3);
  draw_box(tablet, &my_box, color);

  win_blob = cip_window(tablet->src, NULL,
                        my_box.ulx, my_box.uly,
                        my_box.width, my_box.height);

  *x_offset = my_box.ulx;
  *y_offset = my_box.uly;

  return win_blob;
}


/***********************************************************************\
 *
 * ceet_manual_threshold
 *
\***********************************************************************/
void ceet_manual_threshold(image,tablet,flags)
        cip_buffer * image;
        cgrx_tablet * tablet;
        int flags;
{
  int             threshold ;
  unsigned char map[256];
  cip_buffer     * image_copy;
  short           dx,dy,button;

  char string[80];
  double qx,qy, strx,stry;
  int llx, lly; /* lower left corner */
  int i;
  double sx,sy; /* scroll vector */
  double zoom;

  cgrx_get_scroll (tablet, &sx, &sy);
  zoom = cgrx_get_zoom (tablet);

  ceet_draw_histogram(image,tablet,256, 200,tablet->black,flags);

  llx = (sx - 256/zoom) ;
  lly = (sy + 240/zoom) ;
  if (llx < 0) llx = 0;
  if (lly > tablet->src->height) lly = tablet->src->height;


  strx = llx + 50/zoom;
  stry = lly - 100/zoom;

  qy = lly;
  image_copy = cip_copy(image,NULL);
```

App P14 ceet_util.c

4

```
threshold = 128;
for(i=0;i<threshold;i++) map[i]=0;
for(i=threshold; i<256; i++) map[i]=255;
cip_pixel_map(image_copy ,image, map);
cgrx_copy(tablet);
sprintf(string,"%d",threshold);
cgrx_string (tablet,strx,stry,string,tablet->white,tablet->black,1);
qx = llx + threshold/zoom;
cgrx_line(tablet,qx,qy,qx,qy-50./zoom,tablet->white);


printf("Change threshold. Use Trackball\n");
printf("   <LEFT> : exit \n");

cif_tb3_flush();

do
   {
     cif_tb3_read (&dx,&dy,&button);
     if(dx || dy)
       {
          threshold += dx + dy;
          if(threshold < 0) threshold=0;
          if(threshold > 255) threshold = 255;
          for(i=0;i<threshold;i++) map[i]=0;
          for(i=threshold; i<256; i++) map[i]=255;
          cip_pixel_map(image_copy ,image, map);
          sprintf(string,"%d",threshold);


       }
     cgrx_copy(tablet);
     cgrx_string (tablet,strx, stry ,string,tablet->white,tablet->black,1);
     qx = llx + threshold/zoom;
     cgrx_line(tablet,qx,qy,qx,qy-50./zoom,tablet->white);
     etm_delay(100);
   } while (!(button & CTB3_LEFT));

  cgrx_copy(tablet);
  cip_delete(image_copy);
}

/*************************************************************************\
 *
 *   ceet_draw_histogram
 *
\*************************************************************************/
void ceet_draw_histogram (image,tablet,maxw, maxh,color,flags)
     cip_buffer * image;
     cgrx_tablet * tablet;
     int maxw;                   /* max height of histogram */
     int maxh;
     int color;
     int flags;
  {
     int i, total, x_prev, w, h, *cp, y, x;
     int h_prev;

     double yinc, xinc, x_real;
     cip_buffer bar;
     int tallest;
     int size=256;
     int start=2,end=254;
     int llx, lly;  /* lower left corner */
     int anti_color;
     int * hp;
     cip_buffer * ip;

     double sx,sy; /* scroll vector */
     double zoom;

     cgrx_get_scroll (tablet, &sx, &sy);
     zoom = cgrx_get_zoom (tablet);
     ip = tablet->surface;

     anti_color = color > 128 ? 10 : 200;

     hp = cip_xhist(image, NULL);

      llx = sx - 256/zoom ;
      lly = sy + 240/zoom ;
      if (llx < 0) llx = 0;
      if (lly > ip->height) lly = ip->height;

/* find the tallest bin */
      start = (flags & CEET_HIST_ZERO_IN ) ? 0 : 1;
      end = (flags & CEET_HIST_HIGH_IN) ? 255 : 254;

      for(i=start,tallest=0; i<=end; i++) if(tallest < hp[i]) tallest=hp[i];
      if(tallest ==0) tallest =1;

      if(flags & CEET_HIST_LOG_SCALE)
          yinc = (tallest<= 1) ? 0.0 : maxh/ log ((double) tallest) /zoom;
      else yinc = maxh / (double) tallest /zoom;

      xinc = maxw/256.0/ zoom;
      x = x_prev = llx;
      x_real = x_prev + xinc;
      y =  lly;

      h_prev = 0;

      if(start == 1) /* if bin 0 excluded, shift right one position */
        {
          x_prev = x_real;
          x_real += xinc;
        }

      for( i = start ; i <= end ; i++, x_real += xinc )
        {
          w = x_real - x_prev;
          if(flags & CEET_HIST_LOG_SCALE)
            h = hp[i] <= 1 ? 0 : yinc * log((double) hp[i]);
          else h = yinc * hp[i];
          x = x_real;
          y = lly - h;

          if(w)   /* h == 0 case needed for closing outline. don't exclude */
            {
              if(h) cip_set(cip_window(ip, &bar, x, y, w, h ), color);

              if(flags & CEET_HIST_OUTLINE)
                {
                  if(h) cip_set(cip_window(ip, &bar, x, y-1, w, 1),
                                 anti_color);
                  if(h > h_prev)
                    {
                      cip_set(cip_window(ip, &bar, x_prev, y, 1,
                                             h-h_prev), anti_color);

                    }
                  else if (h < h_prev)
```

App 1715 ceet_util.c

5

```
                {
                  cip_set(cip_window(ip, &bar, x+w-1, lly-h_prev,
                                              1,  h_prev-h), anti_color);
                }
            }
          h_prev = h;
          x_prev = x;
        }
    }

/* outline on the right for the last bin if necessary */

     if((flags & CEET_HIST_OUTLINE) && h_prev )
       {
         cip_set(cip_window(ip, &bar, x+w, lly-h_prev,
                                              1,  h_prev), anti_color);
       }

     cgra_empy(tablet);
     if(flags & CEET_HIST_PRINT)
       {
         for(i=0;i<256;i++) printf("%d\t%d\n",i,hp[i]);
       }

     free(hp);

  }
```

APP 716

We claim:

1. An apparatus for determining a characteristic of an edge represented in an input image that includes a plurality of input image pixels, the apparatus comprising:

edge magnitude detection means for generating an edge magnitude image including a plurality of edge magnitude pixels, each having a value that is indicative of a rate of change of a plurality of values of respective input image pixels;

mask generating means, coupled with the edge magnitude detection means, for generating an array of pixel masks, each having a value that is masking or non-masking and that is dependent on a value of one or more respective edge magnitude pixels;

mask applying means, coupled to the mask generating means, for generating a masked image including only those pixels from a selected image that correspond to non-masking values in the array;

histogram means, coupled to the mask applying means, for generating a histogram of pixels in the masked image; and peak detection means, coupled with the histogram means, for identifying in the histogram at least one value indicative of a predominant characteristic of an edge represented in the input image and for outputting a signal representing that value.

2. An apparatus according to claim 1, wherein the input image pixels have values indicative of image intensity, the improvement wherein the mask applying means generates the masked image to include only those pixels of the input image that correspond to non-masking values in the array; and the peak detection means identifies in the histogram a peak value indicative of a predominant image intensity value of an edge represented in the input image and for outputting a signal indicative of that predominant image intensity value.

3. An apparatus according to claim 2, wherein the edge magnitude detection means applies a Sobel operator to the input image in order to generate the edge magnitude image.

4. An apparatus according to claim 1, further comprising:

edge direction detection means for generating an edge direction image including a plurality of edge direction pixels, each having a value that is indicative of an direction of rate of change of a plurality of values of respective input image pixels;

mask applying means includes means for generating the masked image as including only those pixels of the edge direction image that correspond to non-masking values in the array; and the peak detection means identifies in the histogram a peak value indicative of a predominant edge direction value of an edge represented in the input image and for outputting a signal indicative of that predominant edge direction value.

5. An apparatus according to claim 4, wherein the edge direction detection means applies a Sobel operator to the input image in order to generate the edge direction image.

6. An apparatus according to any of claims 2 and 4, wherein the mask generating means sharpens peaks in the edge magnitude image and generates a sharpened edge magnitude image representative thereof and having a plurality of sharpened edge magnitude pixels; and generates the array of pixel masks to be dependent on the sharpened edge magnitude pixels.

7. An apparatus according to claim 6, wherein the mask generating generates each pixel mask to have a masking value for edge magnitude values that are in a first numerical range and for generating a pixel mask to have a non-masking for magnitude values that are in a second numerical range.

8. An apparatus according to claim 7, wherein mask generating means generates each pixel mask to have a masking value for edge magnitude values that are below a threshold value and for generating a pixel mask to have a non-masking for magnitude values that are above a threshold value.

9. A method for determining a characteristic of an edge represented in an input image that includes a plurality of input image pixels, the method comprising:

an edge magnitude detection step for generating an edge magnitude image including a plurality of edge magnitude pixels, each having a value that is indicative of a rate of change of one or more values of respective input image pixels;

a mask generating step for generating an array of pixel masks, each having a value that is masking or non-masking and that is dependent on a value of one or more respective edge magnitude pixels;

a mask applying step for generating a masked image including only those pixels from a selected image that correspond to non-masking values in the array;

a histogram step for generating a histogram of pixels in the masked image; and a peak detection step for identifying in the histogram a value indicative of a predominant characteristic of an edge represented in the input image and for outputting a signal representing that value.

10. A method according to claim 9, wherein the input image pixels have values indicative of image intensity, the improvement wherein the mask applying step includes the step of generating the masked image to include only those pixels of the input image that correspond to non-masking values in the array; and the peak detection step includes a step for identifying in the histogram a peak value indicative of a predominant image intensity value of an edge represented in the input image and for outputting a signal indicative of that predominant image intensity value.

11. A method according to claim 10, wherein the edge magnitude detection step includes a step for applying a Sobel operator to the input image in order to generate the edge magnitude image.

12. A method according to claim 9, comprising an edge direction detection step for generating an edge direction image including a plurality of edge direction pixels, each having a value that is indicative of an direction of rate of change of one or more values of respective input image pixels;

the mask applying step includes the step of generating the masked image as including only those pixels of the edge direction image that correspond to non-masking values in the array; and the peak detection step includes a step for identifying in the histogram a peak value indicative of a predominant edge direction value of an edge represented in the input image and for outputting a signal indicative of that predominant edge direction value.

13. A method according to claim 12, wherein the edge direction detection step includes a step for applying a Sobel operator to the input image in order to generate the edge direction image.

14. A method according to any of claims 10 and 12, wherein the mask generating step includes a step for sharpening peaks in the edge magnitude image and for generating a sharpened edge magnitude image representative thereof and having a plurality of sharpened edge magnitude pixels; and a step for generating the array of pixel masks to be dependent on the sharpened edge magnitude pixels.

15. A method according to claim 14, wherein the mask generating step includes a binarization step for generating each pixel mask to have a masking value for edge magnitude values that are in a first numerical range and for generating a pixel mask to have a non-masking for magnitude values that are in a second numerical range.

16. A method according to claim 15, wherein the binarization step includes the step of generating each pixel mask to have a masking value for edge magnitude values that are below a threshold value and for generating a pixel mask to have a non-masking for magnitude values that are above a threshold value.

17. An article of manufacture comprising a computer usable medium embodying program code for causing a digital data processor to carry out a method for determining a characteristic of an edge represented in an input image that includes a plurality of input image pixels, the method comprising an edge magnitude detection step for generating an edge magnitude image including a plurality of edge magnitude pixels, each having a value that is indicative of a rate of change of one or more values of respective input image pixels;

a mask generating step for generating an array of pixel masks, each having a value that is masking or non-masking and that is dependent on a value of one or more respective edge magnitude pixels;

a histogram-generating step for applying the array of pixel masks to a selected image for generating a histogram of values of pixels therein that correspond to non-masking values in the array; and a peak detection step for identifying in the histogram a value indicative of a predominant characteristic of an edge represented in the input image and for outputting a signal representing that value.

* * * * *